United States Patent [19]

Memmola

[11] Patent Number: 4,733,215
[45] Date of Patent: Mar. 22, 1988

[54] REMOTE CONTROL APPARATUS FOR A PROPERTY PROTECTION DEVICE

[75] Inventor: Serafino Memmola, Varese, Italy

[73] Assignee: DELTA Elettronica S.p.A., Varese, Italy

[21] Appl. No.: 895,481

[22] Filed: Aug. 11, 1986

Related U.S. Application Data

[63] Continuation-in-part of Ser. No. 817,884, Jan. 10, 1986, abandoned.

[30] Foreign Application Priority Data

Nov. 13, 1985 [IT] Italy .................. 83623A/85
Jan. 10, 1986 [IT] Italy .................. 83602A/86

[51] Int. Cl.$^4$ .................. B60R 25/04; G08C 19/00
[52] U.S. Cl. .................. 340/64; 340/506; 340/539; 340/531; 340/528; 340/696; 340/572; 340/825.72
[58] Field of Search .................. 340/64, 63, 528, 529, 340/539, 52 R, 696, 825.72, 825.69, 825.64, 506, 531, 572

[56] References Cited

U.S. PATENT DOCUMENTS

| | | | |
|---|---|---|---|
| 3,833,895 | 9/1974 | Fecteau | 340/528 |
| 3,891,980 | 6/1975 | Lewis et al. | |
| 3,969,709 | 7/1976 | Isaacs et al. | 340/528 |
| 3,987,408 | 10/1976 | Sassover et al. | 304/64 |
| 4,057,805 | 11/1977 | Dowling | 340/825.72 |
| 4,134,108 | 1/1979 | Palmer et al. | 340/539 |
| 4,181,911 | 1/1981 | Black | 340/825.72 |
| 4,191,948 | 3/1980 | Stockdale | 340/539 |
| 4,232,308 | 11/1980 | Lee et al. | 340/539 |
| 4,257,038 | 3/1981 | Rounds et al. | 340/528 |
| 4,260,982 | 4/1981 | DeBenedictis et al. | 340/539 |
| 4,383,242 | 5/1983 | Sassover et al. | 340/64 |
| 4,465,998 | 8/1985 | Durand | 340/557 |
| 4,523,178 | 6/1985 | Fulhorst | 340/64 |

FOREIGN PATENT DOCUMENTS 2423015 4/1978 France .
2545632 5/1983 France .

OTHER PUBLICATIONS

Rev. Esp. Electron (Spain) vol. 29, No. 328 (Mar. 1982).

Primary Examiner—Donnie L. Crosland
Attorney, Agent, or Firm—Peter K. Kontler

[57] ABSTRACT

Apparatus for automatic and semiautomatic remote control of an antitheft protection device of a property is provided. In the automatic embodiment, the apparatus includes a portable transmitter actuated through an encoder, which is programmed for controlling the continuous transmission of message signals timed one from the other at much longer intervals than the message length. The apparatus further includes a receiver having a decoder for matching the signals sent by the transmitter, and as a consequence, controlling the disconnection of the protection device when the message is received and to control connection of the device upon stopping of the reception of the programmed codified signals. The device is thereby operated automatically when a person carrying the transmitter moves away from or approaches the property. In the semiautomatic embodiment, the decoder is reprogrammed upon connection of the protection device, so that thereafter the decoder must receive a matching modified message signal in order to disconnect the protection device. The transmitter itself can be reprogrammed by manually pressing a button thereon to transmit such a modified message signal. In the semiautomatic embodiment the transmitter must be within said range of the receiver and must be reprogrammed to generate a modified message signal before the transmitter can disconnect the device.

20 Claims, 8 Drawing Figures

REMOTE CONTROL APPARATUS FOR A PROPERTY PROTECTION DEVICE

This application is a continuation-in-part of an application Ser. No. 817,884 entitled "Automatic Remote Control Apparatus For A Property Protection Device" filed Jan. 10, 1986 now abandoned.

BACKGROUND OF THE INVENTION

(1) The Present Invention

The present invention relates to a system for automatic remote control of a property protection device such as an antitheft alarm for a motor vehicle, a building, a room, or other delimited area. More specifically, in one preferred embodiment the present invention provides for automatic connection or activation of the alarm system when an authorized person moves away from the property and automatic disconnection or deactivation of the alarm when the authorized person approaches the property. In another preferred embodiment, operation is only semiautomatic; where automatic connection is achieved when the person moves away from the property, and manual activation of a remote control unit is required when the person reapproaches the property.

(2) The Prior Art

Systems for controlling the connection or disconnection of property protection devices or alarm systems are known, including remote control systems. These remote control systems generally include a portable infrared, ultrasonic, or radio transmitter, which is manually actuated by an authorized person who has the transmitter. A receiver of the same type as the transmitter is placed near the property and is generally physically connected to a control for the property protection device. The receiver picks up signals sent by the transmitter and supplies these signals to the control for the protection device itself.

All these prior art remote control systems can only be manually actuated by the person, therefore having the disadvantage that inadvertence, inattention, or mistake may result in either the nonconnection of the property protection device or the improper disconnection of the device without the person having the remote control noticing it.

SUMMARY OF THE PRESENT INVENTION

In accordance with the present invention, a remote control apparatus for automatically controlling a protection device associated with the property is provided, where the device is capable of switching between at least two states with respect to the protection of said property. The remote control apparatus comprises means for generating at least one control signal for controlling the state of said device, transmitting means for transmitting said signal for controlling the state of the protection device, the transmitting means being portable and having a range substantially limiting the distance said control signal can be transmitted, and a receiving means for receiving said signal, the receiving means being responsive to the transmitted signal to switch said protection device to a first state, such as "off", when said signal has been received and to a second state, such as "on", when said signal has not been received for a preselected time interval. In this manner the device is off when the transmitting means is within the range of the receiving means and is on when said transmitting means is outside said range of said receiving means.

In a particularly preferred embodiment, the generating means comprises encoding means for producing identification information such that the transmitted signal comprises said identification information, and the receiving means comprises decoding means responsive to said identification information to switch said protection device to the off state only when said identification information is being received. Also, the encoding means may be adapted for operation from an electrical energy source, such as a battery, and the encoding means comprises means for continuously generating a series of signals such that each signal has a predetermined time duration that is relatively short compared to the time interval between signals in the series. In this manner, the energy consumed by the encoding means is reduced and the life of the electrical energy source is extended.

The apparatus of the present invention further comprises means for monitoring the capacity of the electrical energy source and disconnecting said source when the source capacity falls below a predetermined level. The apparatus of the present invention comprises means for manually reconnecting said source, such as a pushbutton means, to said encoding means for a limited time, whereby the energy source is conserved by interrupting the continuous generation of said signals when said capacity falls below said level and by manually reactivating the encoding means temporarily as required.

In a particularly preferred embodiment the remote control apparatus is designed for automatically controlling a property theft protection device where the protection device is switchable between an "on" condition and an "off" condition, and the protection device registers an alarm if an unauthorized person attempts to gain access to the property while the protection device is on. The remote control apparatus comprises at least one radio transmitting means for controlling the on-off condition of the protection device, the radio transmitting means being portable and being adapted for carrying about by an authorized person. The radio transmitting means is capable of transmitting the radio signal for only a predetermined distance. At least one means for receiving said radio signal is mounted adjacent said property and is responsive to the radio signal to switch the alarm to the off condition when said signal has been received and to said on condition when said signal has not been received. The transmitting means may comprise means for generating identification information associated with the said transmitting means, and the receiving means is responsive to said radio signal to switch said protection device off only when said signal received comprises said identification information.

In yet another preferred embodiment, operation is only semiautomatic. The remote control apparatus is provided also with a hand control. An encoder is suited to be partly programmed upon assemblage and partly programmable during operation by actuating the said hand control. The decoder is suited to be programmed partly upon assemblage corresponding to the same code on which the remote control encoder is partly programmed upon assemblage. The decoder is also partly automatically programmable during operation on the same code on which the encoder is partly programmable. When the protection devices are not connected and the encoder is not hand controlled, the encoder sends messages codified according to the same code on which the decoder is programmed when the protection devices are not connected. Therefore, the signals transmitted by the remote control are received and considered valid by the decoder of the receiver unit, which keeps therefore the protection devices disconnected. On the contrary, the devices are automatically connected when the person having the remote control moves away from the property, because the decoder stops receiving the signals and controls as a consequence the connection of said devices. Simultaneously with the connection of said protection devices, the programmable part of the decoder code is automatically modified.

When the person having the remote control again approaches the property, the messages which the receiver begins to pick up again are not considered valid by the decoder, because its code has been automatically modified and no longer corresponds to the one of the encoder. The person having the remote control is therefore required to modify the programmable part of the encoder codification by operating the hand control so that the encoder code corresponds to the decoder code at that moment. Thereafter, when the encoded signals now sent by the remote control and received by the receiver unit are considered valid by the decoder, the decoder controls as a consequence the disconnection of the protection devices and again automatically modifies the programmable part of the decoder code according to the code on which the encoder is programmed when the hand control of the same is not actuated. Accordingly, the encoder now transmits and the decoder now receives signals to maintain the disconnection of the devices.

In an improvement of the previous embodiment, the decoder is equipped with a device suitable for delaying the automatic connection of the protection devices and the change of the decoder's own code. A device is also included suitable for signalling the occurred change of the code in order to enable the person having the remote control to stop operating the hand control.

It is an object of the present invention to provide automatic remote control apparatus that switches a property protection device "off" as an authorized person approaches the property and "on" as the person moves away from the property, without the person having to consciously activate or deactivate the device.

It is a further object of the present invention to provide apparatus comprising a transmitting unit that can be identified by the receiving unit as a specific authorized transmitting unit, such that the protection device can be controlled only by the properly identified transmitting unit.

It is a further object of the present invention to provide apparatus where the transmitting unit is portable and operates from a self-contained electrical energy source such as a battery to continuously transmit control signals, and the electrical energy source may be conserved by providing means to automatically switch the battery off to thereby cease continuous transmission when the battery capacity is diminished below a certain level. Means are also provided, such as a pushbutton, for manually reconnecting the battery by the authorized person when it is desired to resume transmission for a limited time, such as when the person desires re-entry to the protected property.

It is a further object of the present invention to provide apparatus comprising a transmitting unit that continuously transmits a series of codified identification messages for receipt and recognition by the receiving unit, wherein the time duration of each identification message in the series is relatively short compared to the time interval between successive messages in the series, whereby the energy source such as a battery may be conserved.

It is a further object of the present invention to provide a semiautomatic remote control apparatus that automatically switches a property protection device "on" as an authorized person moves away from the property, but requires manual switching of the property protection device "off" as the person approaches the property. This eliminates the possibility of uncertainty of the unintended switching "off" of the protection device when the person carrying the remote control may or may not come within the transmitting range of the control unit, which may be widely variable depending upon wave propagation characteristics.

Further objects and attendant advantages of the present invention will become apparent from the following description.

DETAILED DESCRIPTION OF THE PREFERRED EMBODIMENT

Figure 1:
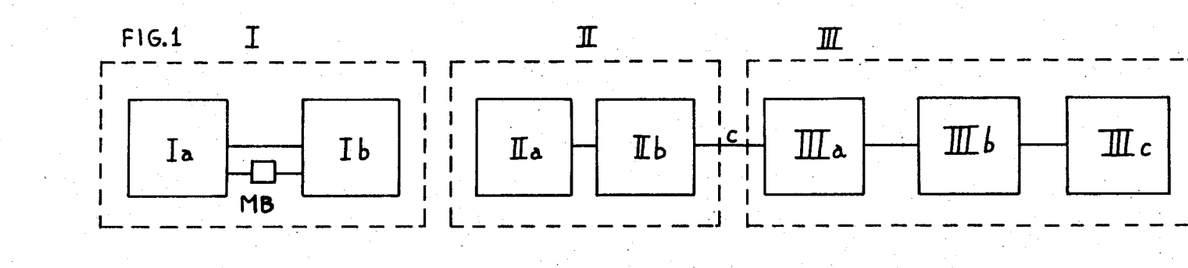
FIG. 1 is a block diagram of the automatic remote control apparatus of the present invention.
Figure 2:
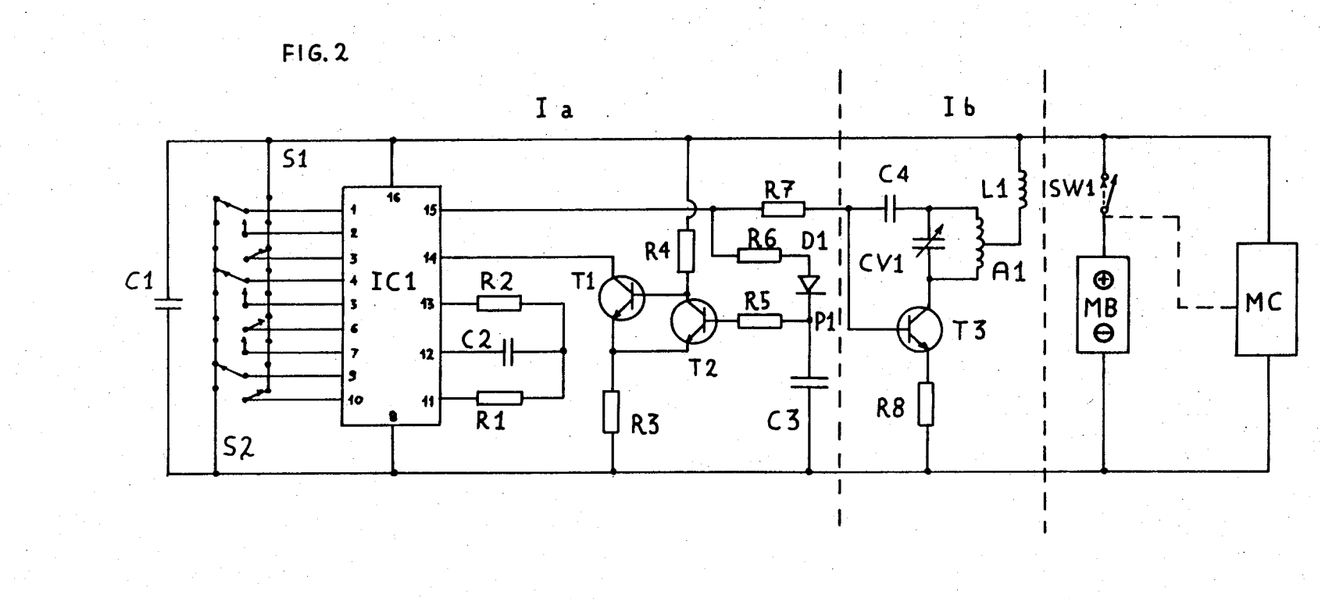
FIG. 2 is a schematic diagram of the transmitter unit of the present invention.

As seen in FIG. 1, the apparatus of the present invention comprises a remote control transmitter unit I and a receiver unit II connected to the property protection device III, such as an antitheft alarm warning system associated with the property. The transmitter unit or remote control I comprises an encoding section Ia providing a coded message or identification information and a radio transmitter section Ib. As seen in FIG. 2, battery MB supplies the encoder Ia and transmitter section Ib. Transmitter unit I is portable and adapted for carrying about by an authorized person, who could for example carry unit I in his pocket. It is understood that there could be more than one authorized person, each with a transmitter unit.

The receiving unit II comprises a radio receiving section IIa and decoding section IIb. Receiving unit II would typically be mounted on or adjacent the property to be protected, such as for example mounted under the dashboard of a motor vehicle.

The antitheft system III can be any suitable alarm system well known to the prior art, such as an intruder detection or fire alarm system. The system would typically be an alarm IIIb that is in either the connected or "on" state or the disconnected or "off" state. The alarm could be switched between states, such as from "off" to "on" and vice versa, by any well known switching means IIIa, and means such as a light panel indicator IIIc can be provided for communication to any authorized person whether the alarm system is on or off. However, the alarm could be more sophisticated with different levels or zones to be turned off, on, or to some other desired state. This antitheft system III is placed in communication with the receiver unit II by any suitable communication link, and can be placed either adjacent to or remote from the property.

The battery MB is preferably a Sylva-Cell composed of four cells GO-5675PX, 1.35 Vcc each, series connected, and has therefore 5.4 Vcc and a capacity of 220 mA/h with a life of approximately 11,000 operation hours at an average current output lower than 20 mA.

The encoding section Ia produces a signal comprising repetitious coded messages or identification information for permitting the receiver unit II to recognize a particular transmitter as being either authorized or unauthorized for disconnecting the alarm system. A corresponding decoder section in the receiver unit II, described more fully below, permits switching of the alarm system to the "off" state only when the proper identification information is received and matches the identification information stored or programmed in the decoder.

Figure 3:
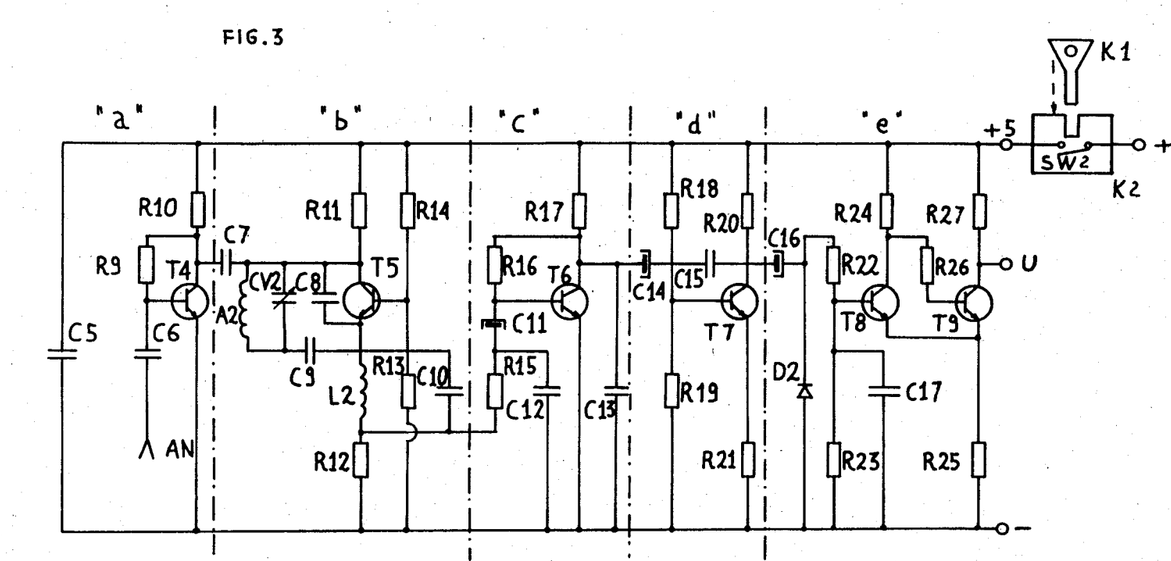
FIG. 3 is a schematic diagram of the receiver unit of the present invention.

The encoding section Ia preferably comprises an integrated circuit chip IC1, which is preferably an encoder MC145026 by Motorola Semiconductors. Integrated circuit IC1 has 16 pins wherein the 1, 2, 3, 4, 5, 6, 7, 9, and 10 pins are the nine encoding pins, in trinary for the first eight and in binary for the last one, thereby providing the possibility of 13,122 different codes. The trinary code is obtained with the high, low, and open states of said pins, while the binary is obtained only with the low and high states. When being assembled, the pins can be connected for the high state with the contacts of the bar S1 connected to the positive terminal of battery MB, for the low state with the contacts of the bar S2 connected to the negative terminal of the battery MB, and the first eight pins can remain open, this position being the third state. The code shown in FIGS. 2 and 3 is "−a+−a+a−+".

The pins 16 and 8 are respectively connected to the positive and to the negative for the supply of the integrated circuit and to the protection capacitor C1 (100 kpF), the pin 12 to the capacitor C2 (330 pF) and the pins 11 and 13 to the resistors R1 (1 Mo) and R2 (470 ko) respectively, which complete the inner oscillator of IC1. The time constant $R2 \times C2$ is equal to $1/2.3$ times the clock time. Pin 14, which is connected internally to a pullup, upon receiving a low impulse determines the integrated circuit beginning to operate; i.e., a parallel reading of the encoding pins state and then a second reading. As a consequence there is an output from the pin 15 of a sequence of impulses corresponding namely sequentially to the states of the encoding pins, each output bit being composed of two high impulses in the bit period. If the state of the corresponding pin is high, then the said impulses are both short. If the state is low, then they are long. If the state is open, one impulse is long and one is short. The output message of IC1, in consequence of a negative impulse at pin 14, is composed of two words equal to one another composed each of nine bit periods.

The integrated circuit IC1 is connected through the pins 14 and 15 to a Smith trigger comprising the two transistors T1 and T2 (BC2390C) with the resistors R3 (47 ko), R4 (2.2 Mo), R5 (15 Mo), R6 (390 ko), the diode D1 (1N4148), the capacitor C3 (33 kpF), and the resistor R7 (220 ko). When the battery MB is installed a low voltage immediately occurs at point P1 and therefore T2 is not turned on, but through R4, T1 is turned on, which immediately causes a low impulse on pin 14. As explained above, this causes the integrated IC1 circuit to start. For each low impulse, integrated circuit IC1 outputs from the pin 15 a message composed of two words, which through R6 and D1 charges C3 very quickly. When the output sending of the message is stopped, C3 starts a slow discharge through R5, the emitter of T2, and R3. T2 remains thus turned on with the consequence that T1 becomes nonconductive and the pin 14 therefore remains insulated. As a consequence, the integrated circuit IC1 sends no further output signals from the pin 15. When the discharge current of C3 decreases below a predetermined value, T2 is turned off, and T1 is turned on again through R4, thus causing a low impulse to the pin 14 to repeat the described cycle, whereby the message composed of two words is sent with a period predetermined by the values of the components, particularly the value of C3, the said period being approximately 1.8 seconds. The length of the message, specifically the two words and the short interval between one and the other word, is much lower and is approximately 10 milliseconds.

Under normal operation battery MB or other suitable electrical energy source is in place and switch SW1 is normally closed. The encoding means continuously generates a repetitious series of identification information signals for transmission by the transmitter section Ib. Each signal has a predetermined time duration, preferably on the order of approximately the 10 milliseconds described above. Each separate identification signal, or set of words, is separated in time from the previous set of words in the series, such separation time interval being predetermined and preferably being on the order of the 1.8 seconds described above. By thus making the identification signal relatively short compared to the separation interval, the electrical energy consumed by the encoder is reduced and the power supply such as battery MB is conserved.

In order to prevent the transmitter from constantly consuming electrical energy to the point where the battery MB may be completely exhausted when the authorized person tries to regain entry to his property after a long absence, the transmitter further comprises a conventional monitoring circuit MC for detecting when the battery voltage or capacity has fallen below a predetermined level or ability to supply electrical energy. When such a condition is detected, monitoring circuit MC operates conventional switch SW1 such that the battery is switched out or removed from the circuit. Switch SW1 can also comprise a pushbutton or other suitable means so that the authorized person can manually close SW1, reconnect the battery, and resume transmission of the identification information signal for a limited time, said signal upon manual reconnection being transmitted either for a predetermined number of words or for so long as the pushbutton is depressed. The transmitting means may be temporarily reactivated as required or until a new battery MB is installed.

The impulses of the message arrive through resistor R7 to the radio transmitter section Ib, which transmits radio waves modulated in accordance with the identification message information from the encoder, such that a control signal comprising the identification information is transmitted. Transmitter section Ib has a range substantially limiting the distance that the control signal can be transmitted, said distance being determined by the characteristics of the components making up transmitter Ib.

The transmitter section Ib includes the capacitor C4 (3.3 pF), the transistor amplifier T3 (BF199), the resistor R8 (2.2 ko), the capacitor CV1 adjustable from 2.5 to 6 pF, the coil A1 with a turn $\phi 1$ mm having 10 mm inside diameter operating both as oscillating circuit with CV1 and as an antenna, and the inductor L1 (10 $\mu$H).

The radio receiver section IIa of the unit II as shown in FIG. 3 is composed of an HF amplifier "a", a super-reactive receiver "b", two stages "c" and "d" for LF amplification, and a pulse shaping section "e".

The HF amplifier "a" is composed of the transistor T4 (BFR91) with the resistors R9 (47 ko) and R10 (560 o), the capacitors C5 (1 kpF) and C6 (6.8 pF) and the antenna AN.

The super reactive receiver "b" includes the capacitors C7 (0.68 pF), C8 (3.3 pF), C9 (33 pF) and C10 (270 pF), the adjustable capacitor CV2 having a range from 2.5 to 6 pF, the copper coil A2 with 2.5 turns $\phi 1$ mm and inside diameter of 4.6 mm and 1 mm distance between the turns, the inductor L2 (10 $\mu$H), the resistors R11 (10 ko), R12 (15 ko), R13 and R14 (82 ko), and transistor T5 (BFR91).

The first stage "c" of the low frequency amplifier includes the transistor T6 (BC239C) with the resistors R15 (47 ko), R16 (4.7 Mo) and R17 (10 ko), the capacitors C12 and C13 (both 1 kpF), and the 2.2 $\mu$F electrolytic capacitor C11. The second stage "d" of the amplifier includes the transistor T7 (BC239C) with the resistors R18 (560 ko), R19 (82 ko), R20 (8.2 ko) and R21 (100 ko) and the electrolytic capacitor C14 (2.2 F) and the capacitor C15 (330 pF).

The pulse shaping section "e" is composed of the electrolytic capacitor C16 (2.2 $\mu$F), the diode D2 (AA117), the Smith trigger including the resistors R22 (47 o) and R23 (220 ko), the transistors T8 and T9 (BC182), the resistors R24 (33 ko), R25 (220 o), R26 and R27 (10 ko) and the 1 kpF capacitor C17.

The terminals +5 and — of the receiver are respectively connected to a voltage regulator LM2931 by National Semiconductors, which is not shown in the drawings and is supplied by the motor vehicle battery. A key K1-lock K2 system, described more fully below, operates SW2, which is normally closed to supply the ordinary operating voltage +5 to the receiver. The output terminal U of the receiver, which is the collector of T9, is connected to the input terminal E of the decoder section IIb.

Figure 4:
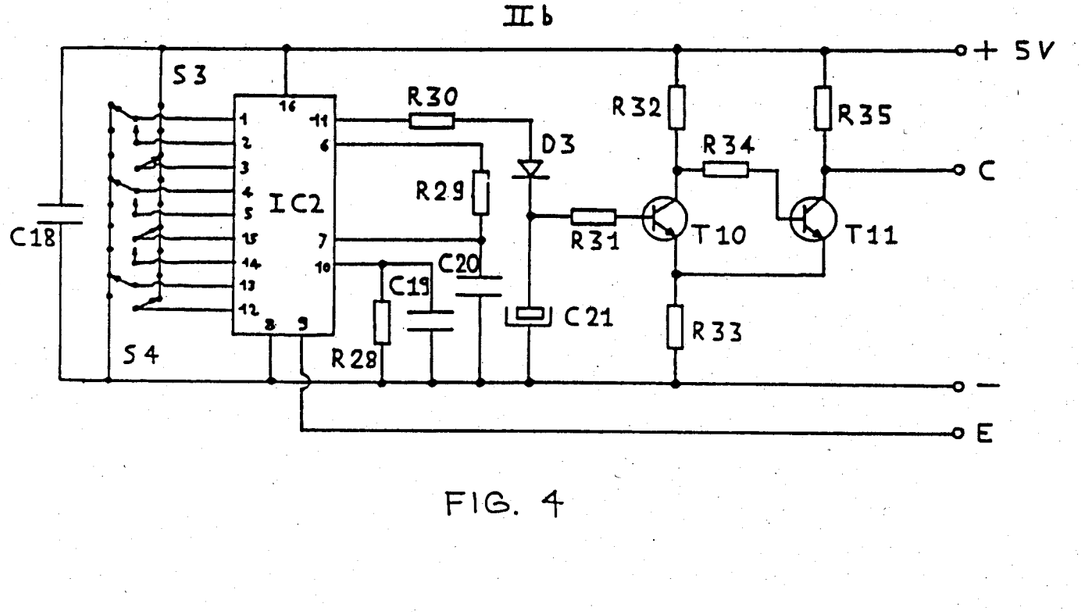
FIG. 4 is a schematic diagram of the decoder of the present invention.

Decoder section IIb shown in FIG. 4 includes the integrated circuit IC2, which is a Motorola decoder MC145028 of the same family as the encoder MC145026 of the remote control I. Integrated circuit IC2 is provided with 16 pins, where the pins 1, 2, 3, 4, 5, 15, 14, 13, and 12 are connectable, when arranging for installation respectively to the contacts of the bars S3 connected to the positive and S4 to the negative or may remain (the ninth excepted) open so as to establish the same encoding as the pins 1, 2, 3, 4, 5, 6, 7, 9, and 10 of the integrated circuit IC1 of encoder section Ia. The pins 16 and 8 of IC2 are respectively connected to the positive and to the negative output of the voltage regulator, and the protection capacitor C18 (100 kpF) is connected in parallel with them. The pins 6 and 7 are connected through the resistor R29 (560 ko) and the capacitor C20 (1 kpF) to ground, while the pin 10 is connected to ground through the resistor R28 (120 ko) and the capacitor C19 (100 kpF).

The pin 9 is connected to the input terminal E of the decoding section IIb, and therefore to the output terminal U of the receiving section IIa, and receives in low frequency the messages transmitted by the transmitting unit I. As a consequence the output of pin 11 is a signal of valid transmission, and the resistor R30 (2.2 ko), the diode D3 (1N4148), the electrolytic capacitor C21 (2.2 $\mu$F) and the Smith trigger including the two transistors T10 and T11 (BC239C) with the resistors R31 (3.3 Mo), R32 (120 o), R33 (5.6 ko), R34 (82 ko) and R35 (10 ko) are connected to pin 11. The output terminal C of the decoding section IIb, which controls the warning system III, is connected to the collector of T11. R29 and C20, which are connected as shown to the pins 6 and 7, determine whether the input pulses on pin 9 are short or long, as their codification has been a pulse width modulation. The time constant R29×C20 is fixed at 1.72 times the clock period and therefore at 3.95 times the time constant R2×C2 of the encoder Ia. The time constant R28×C19 is 33.5 times the clock period and determines the duration of the valid transmission pulse.

The radio transmitter section Ib can transmit the signals or coded message from the encoder Ia only a limited distance, which can be readily predetermined by proper choice of the values and characteristics of C4, CV1, R8, T3, A1, and L1. When the authorized person having the remote control I is more than the predetermined distance away, then no signals will be received by receiver II, and the alarm system III will be in an "on" or armed condition. The decoder II connects or turns the alarm system III "on" after a predetermined time of nonreception of the signal from the transmitter. This predetermined time is generally based on a predetermined number of expected encoded messages, and in addition the disconnection of the alarm can be achieved as soon as the first or at most the second encoded message is received.

When the authorized person having the remote control transmitter unit I approaches the property, such as a motor vehicle, then the receiver section IIa begins to pick up the valid signals transmitted and passes them on to the decoder section IIb. If the codification of the first message corresponds to the one established by IC1, then the integrated IC2 outputs through pin 11 a high impulse which goes to charge the relatively quick charge capacitor C21 through R30 and D3. The time constant R30×C21 is also lower than the constant R28×C19 corresponding to the duration of the output signal through pin 11 and the discharge of C21, which is very slow for the high value of R31, actuates the Smith trigger. This brings the transistor T10 to a conductive state, therefore turning off T11 with a resultant high state of the output terminal C. This high state of terminal C causes the disconnection of the warning system III through a conventional switching mechanism IIIa. If the transmission of the messages continues, then T10 remains turned on and T11 remains turned off; therefore, the warning system remains disconnected for the whole period during which valid messages, i.e. encoded as predetermined, arrive at receiver unit II.

When on the contrary the reception of valid messages stops because the person having the remote control has moved away from the property, IC2 stops sending valid signals through pin 11. C21 is no longer charged, so that its low discharge after the last charge continues until T10 is turned off. This occurs approximately 1 second after the signals cease. When T10 is no longer conductive, then T11 is turned on through R32 and R34 and consequently the collector of T11 and the output terminal C connected thereto go low. The low state of terminal C then causes the connection or arming of the protection device, which can be accomplished with switching mechanism IIIa.

The automatic remote control apparatus of the present invention is particularly useful with a motor vehicle. A motor vehicle is typically controlled by an ignition key K1 placed in a lock K2 controlling the ignition circuit. It is advantageous to lockout or disable the alarm system III when the key K1 is placed in the ignition lock K2 by conventional switching means SW2 being opened when K1 is inserted into the lock K2. Accordingly, when used for a motor vehicle, it is particularly preferable for the receiver to have any conventional disabling means such as SW2 for locking out or disabling the receiver when the key is placed in the ignition, so that the receiver is ineffective to switch the alarm on when the key is in the lock.

Figure 3A:
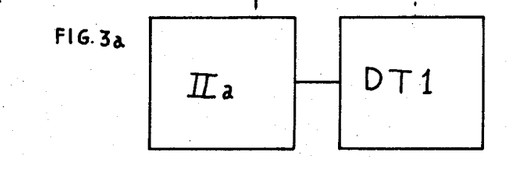
FIG. 3A is a block diagram of one preferred embodiment of the present invention.

Another preferred embodiment, especially useful for a motor vehicle but equally useful for a room or a building, is a conventional detector DT1 as shown in FIG. 3A for determining when a person is inside the vehicle or other property. The detector, such as for example a conventional motion detector, is responsive to the presence of said persons to lockout or prevent the receiving means from switching the alarm on or off while persons are inside the property.

Figure 5:
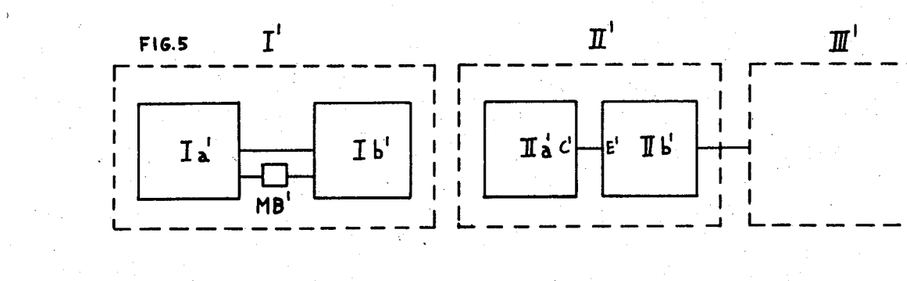
FIG. 5 is a block diagram of the semiautomatic remote control apparatus of a particularly preferred embodiment of the present invention.
Figure 6:
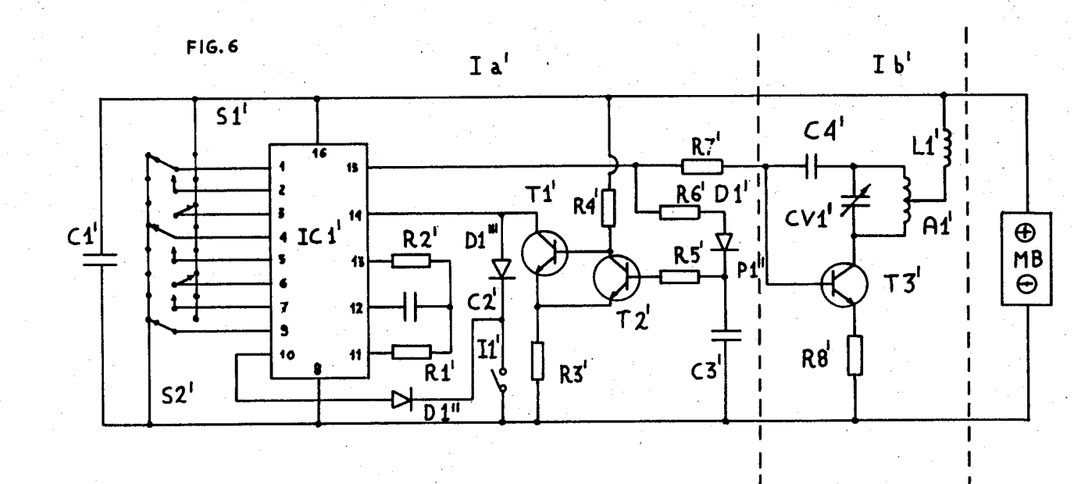
FIG. 6 is a schematic diagram of the transmitter unit of the embodiment of FIG. 5.
Figure 7:
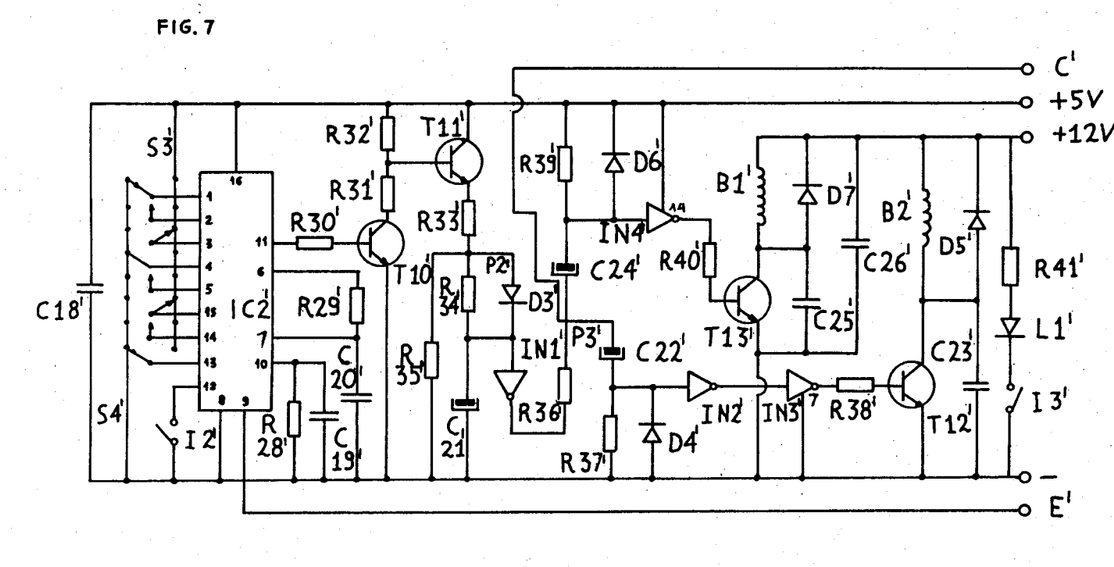
FIG. 7 is a schematic diagram of the decoder unit of the embodiment of FIG. 5.

The system of the semiautomatic embodiment, which FIGS. 5, 6, and 7 refer to, is a system for automatic connection of the protection devices and for disconnection by hand control of the remote control after the person having the remote control has approached the property.

The semiautomatic embodiment also includes a transmitting unit I' that is the proper remote control with encoder Ia' and radio transmitter Ib', and a receiving unit II' with radio-receiver IIa' and decoder-comparator IIb', as well as the control of the protection devices III' as shown in FIG. 5.

The remote control I' is composed as shown in FIG. 6 from the first preferred embodiment shown in FIG. 2 with the only difference being that the pin 10 of IC1' of the encoder is now normally open but can be put to ground by closing the switch I1'. Closing switch I1' occurs by hand controlling a push button (not shown) and with which the remote control I' is provided. Said switch I1' has a contact which is connected to ground and the other one is connected, through the protection diodes D1" and D1'" (1N4148) to said pin 10 and to the pin 14 of IC1' respectively, as shown in FIG. 6. In FIG. 6 all the components are shown with generally the same reference numbers as in FIG. 2, with the added mark ', and have substantially the same functions and values as those of the first example. The first eight trinary encoding pins 1, 2, 3, 4, 5, 6, 7, and 9 represent the part programmed upon assemblage of the system and allow in this second example only about 6,561 different codes. The remote control operation is therefore identical to the remote control operation of the first example, except that the encoder code can be one of the 6,561 codes possible for the first eight pins. In the example of FIG. 6 the encoder code is "−a+−a+a−" with one "a" or one "−" for the ninth pin or pin 10, according to the position of switch I1'.

The radio receiver IIa' of the receiving unit is exactly equal to the one of the first example, illustrated with reference to FIG. 3. The decoder IIb' however is different and is composed as shown in FIG. 7. The decoder IIb' includes the integrated circuit IC2', which is a Motorola MC145028 decoder of the same family of the encoder MC145026 of the remote control I'. IC2' is provided with sixteen pins, eight of which (i.e. 1, 2, 3, 4, 5, 15, 14, and 13) are connectable, when arranging for assemblage, either to the contacts of the conductors S3' or S4', or to the positive and to the negative respectively, or may remain open so as to establish the same encoding with which the pins 1, 2, 3, 4, 5, 6, 7, and 9 of the integrated circuit IC1' of the encoder Ia' have been prepared. The pin 12, the state of which is also part of the code, is connected to the negative or left open according to the closed or open position of the switch I2' of a bistable relay of a SDS-Relais Italia s.r.l., which includes the two control coils B1' and B2' and two switches I2' and I3' in parallel.

The pins 16 and 8 of IC2' are connected to the positive and to the negative output respectively of the cited voltage regulator and the protection capacitor C18' (100 kpF) is parallel connected with them. The pins 6 and 7 are connected through the resistor R29' (560 ko) and the capacitor C20' (1 kpF) to ground, while the pin 10 is connected to ground through the resistor R28' (120 ko) and the capacitor C19' (100 kpF) The pin 9 is connected to the input terminal E' of the decoding section IIb' and therefore to the output terminal U' of the receiving section IIa' and receives therefore in low frequency the messages which are transmitted by the remote control I'. The pin 11 outputs the signal of valid transmission when the signals received by the pin 9 correspond to the codification of IC2'. Pin 11 is connected to the Smith trigger, which includes the transistor NPN T10' (BC182B), the PNP T11' (BC212B) and the resistor R30' (22 ko), R31' (560 o), R32' (10 ko) and R33' (22 o). The trigger is connected through the collector of T11' and R33' to the point P2' of the circuit, which is connected downstream to point P3' through the circuit including the resistor R34' (330 ko), R35' (4.7 ko) and R36' (1 ko), the electrolytic capacitor C21' (2.2 μF), the diode D3' (1N4148) and the inverting Smith trigger IN1'. IN1' is part of the integrated circuit MM54C14 Hex Smith Trigger of the National Semiconductors that includes six units IN1'-IN6', only four of which are used in the described circuit. Point P3' is connected downstream to the output terminal C' of the decoding section, which acts upon the control of the protection devices III'. Point P3' is also connected to the two control units of the coils B1' and B2', which control the switches I2' and I3'.

The control circuit of the coil B2' of the relay includes the electrolytic capacitor C22' (2.2 μF), the resistor R37' (470 ko), the diode D4' (1N4148), the inverting triggers IN2' and IN3', the resistor R38' (3.3 ko), the transistor NPN T12' (PN222A), the capacitor C23' (100 KpF) and the diode D5' (1N4148).

The control circuit of the coil B1' includes the electrolytic capacitor C24' (2.2 μF), the resistor R39' (470 o), the diode D6' (1N4148), the inverting trigger IN4', the resistor R40' (3.3 ko), the transistor PNP T13' (PN222A), the diode D7' (1N4004) and the capacitors C25' and C26' (100 kpF). The coils B1' and B2' are connectable to the negative through the collectors of the transistors T13' and T12' respectively and are connected to the positive of the 12 Vcc vehicle battery, which also the protection diodes D7' and D5' are connected to. The circuit downstream of point P3' also includes the LED L1" (Siemens CQ×23-11) with the resistor R41' (470 o) and the switch I3', controlled in parallel with I2' by the coils B1' and B2' of the bistable relay.

The unit composed of R29' and C20', which are connected to the pins 6 and 7 of IC2', determines whether the input pulses coming through pin 9 are short or long as their codification has just been a pulse width modulation. The time constant R29'×C20' is fixed at 1.72 times the clock period and therfore at 3.95 times the time constant R2'×C2' of the encoder Ia'. The time constant R28'×C19' is 33.5 times the clock period and determines the duration of the valid signal impulse.

The system operates therefore as follows. As the driver leaves the vehicle and begins to move away, the antitheft system is at first still disconnected. The predetermined intermittent encoded message continuously transmitted by the remote control is "−a+−a+a−a", the last code being "a" because the pin 10 of IC1' of the remote control is open as the switch I1' is open. The code "−a+−a+a−a" continues to be received by the receiver IIa' and passed to the decoder-comparator IIb', which finds the code valid as predetermined because during disconnection the switch I2' is open and therefore the codification of the decoder is also "−a+−a+a−a". Accordingly, pin 11 of IC2', which is actuated by the positive impulse of the signal arriving to pin 9, continues to send positive impulses of valid transmission. These impulses bring T10' into conduction and the negative collector of T11' turns on the transistor NPN T11'. The collector of T11' therefore brings positive impulses through R33' to the point P2'. These positive impulses cause the quick charge or C21' (time constant C21'×R33') through D3' while the time of C21' discharge corresponding to the time constant C21'×(R34'+R35') is not only much higher than the time of its quick charge but also than the duration of the signal of valid transmission coming from pin 11, which corresponds to the time constant C19'×R28'. As a consequence said positive in P2' determines a negative downstream of IN1' and R36' at the point P3' of the circuit. This causes a negative at the terminal C', the disconnection of the protection devices corresponding to said negative signals. The negative at P3' causes in the same time the charge of C24' according to the time constant (C24'×R39'). There is, therefore, a positive downstream of IN4', which brings in conduction the transistor T13' through R40', the collector of which in going to ground causes the excitation of the coil B1' to open I2', which remains open.

When the person having the remote control has sufficiently moved away from the motor vehicle, the receiver IIa' stops receiving the messages of the remote control and the signal to pin 9 of IC2' stops. IC2' no longer sends signals of valid transmission to pin 11, and the result is the turning off of T10' and T11'. Therefore, the collector of T11' and the point P2' become negative for their connection to ground through R35'. This negative causes through R34', IN1' and R36' a positive to the point P3', but only after the practically complete slow discharge of C21' through R34' and R35'. This positive causes through terminal C' the connection of the protection devices and the quick charge of C22' according to the time constant C22'×R37'. There is consequently a positive impulse upstream of IN2', which becomes newly positive downstream of IN3' and through R38' brings T12' into conduction. The coil B2' is excited, and the switch I2' is closed and remains closed.

As a consequence, when the person having the remote control reapproaches the motor vehicle the codification of the message transmitted by the remote control is "−a+−a+a−a", which does not now correspond to the decoder which is now "−a+−a+a−−", because the pin 12 of IC2' is now connected to ground. The person therefore has to act manually on the control push button of the switch I1' of the remote control, so that the pin 10 of IC1' is connected to ground and the codification of the output message therefore also becomes "−a+−a+a−−" corresponding to the decoder. Accordingly, IC2' upon receipt of said signal at pin 9 outputs from pin 11 the positive signal of a valid message. As a consequence T10' and T11' are turned on. As already described above, negative impulses are therefore brought to terminal C' for disconnecting the protection devices.

Also, coil B1' is excited and I2' and I3' are opened and remain open. Closure of I2' is possible only automatically by the coil B2', when the protection devices shall be automatically connected again.

The switch I1' on the remote control brings through D1" a continuous negative to pin 14, so that the output message of IC1' is no more constituted by two words of short length spaced one from another by a relative to said length long periods, but only by words one after the other, in order to control in the shortest time the disconnection of the warning system.

However, the person having the remote control has to stop depressing the hand control or push-button when the person sees that the LED L1" goes out. LED L1" is preferably mounted on or near the property, such as the car.

If the person continues depressing the push-button, a new automatic connection of the warning system and change of the decoder code may occur, because after the quick switching on of the switch I2' the changed code of IC2' does not correspond to that of IC1'. However, the reconnection of the warning system and change of the code of IC2' may occur only with a relatively substantial delay relative to the automatic control because the positive at point P3' (that is, the negative upstream of IN1') may occur only after the substantial discharge of C21', which is slow considering the high value of R34' and consequently of the time constant C21'×(R34'+R35').

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. Apparatus for controlling a protection device associated with a property, said device being controllable between at least a first and a second state with respect to the protection of said property, said apparatus comprising:
   (a) means for generating a control signal for controlling the state of said protection device, said generating means being programmable for generating a modified control signal;
   (b) means for programming said generating means to generate said modified control signal;

(c) means for transmitting said control signals, said transmitting means being portable and having a range substantially limiting the distance said signal can be transmitted;

(d) means for receiving said signals, said receiving means being responsive only when said modified control signal has been received to control said protection device to said first state; and (e) means for controlling said protection device between said first and second states in response to said received control signals, said controlling means controlling said device to said second state in the absence of a control signal, whereby said transmitting means must be within said range of said receiving means and said programming means must be activated to program said generating means to generate said modified control signal before said generating means can control said protection device from said second state to said first state.

2. The apparatus of claim 1, wherein the receiving means is capable of being programmed between a first and a second condition, said first condition for controlling said protection device to said first state when said control signal is being received and said second condition for controlling said protection device to said first state when said modified control signal is being received, and said receiving means further comprises means for converting said receiving means to said second condition in response to said protection device being controlled to said second state.

3. The apparatus of claim 2, wherein said converting means further comprises means for reconverting said receiving means to said first condition in response to receipt of said modified control signal.

4. The apparatus of claim 3, further comprising means for delaying the conversion of said receiving means to said second condition and the controlling of said protection device to said second state.

5. The apparatus of claim 4, further comprising means for indicating when said protection device has been controlled to said first state.

6. The apparatus of claim 5, wherein said indicating means comprises an LED.

7. Apparatus for remotely controlling a protection device associated with a property, said device being capable of enablement and disablement with respect to the protection of said property, said apparatus comprising (a) remote control means comprising
 (1) means for generating control signals, said generating means being reprogrammable to generate modified control signals;
 (2) activating means for reprogramming said generating means to generate said modified control signals;
 (3) means for transmitting said control signals;

(b) protection device enabling-disabling means comprising
 (1) means for receiving said transmitted control signals;
 (2) means operatively connected to said receiving means for decoding said received signals and disabling said protection device when said decoding means is receiving a valid control signal and enabling said protection device when a valid control signal is not being received, said decoding means being reprogrammable so that receipt of a modified control signal is required by the decoding means to disable said protection device;
 (3) means for automatically reprogramming said decoding means in response to the enablement of said protection device;

whereby, after said protection device has been enabled, said activating means must reprogram said generating means to generate a modified control signal before said device can be disabled by said remote control means.

8. The apparatus of claim 7, wherein the decoding means is capable of assuming a first decoding state for disabling the protection devices when a control signal is received and being reprogrammed to a second decoding state for disabling the protection devices only when a modified control signal is received, and said automatic reprogramming means comprises means for switching said decoding means between said first and second decoding states, said switching means being responsive to switch said decoding means to said second decoding state when said protection device has been enabled and to switch said decoding means back to said first decoding state after said protection device has been disabled in response to said activating means reprogramming said generating means to generate a modified control signal to disable said device, whereby said decoding means is returned to said first decoding state and maintains the protection device in said disabled condition in response to control signals generated by said generating means.

9. The apparatus or claim 8, further comprising means for delaying the switching of said decoding means to said second decoding state and the enablement of said protection device.

10. The apparatus of claim 8, wherein said switching means comprises a decoder switch having a first position and a second position, said first position corresponding to said first decoder state and said second position corresponding to said second decoder state, said decoder switch being operable between said first and second positions in response to at least one solenoid means, said solenoid means being operatively connected to said decoding means for operating said decoder switch to said second position when said decoding means enables said protection device.

11. The apparatus of claim 10, wherein said solenoid means operates said decoder switch from said second position to said first position when said decoding means disables said protection device.

12. The apparatus of claim 7, wherein said generating means comprises encoding means capable of assuming a first encoding state for generating at least one control signal and being reprogrammed to a second encoding state for generating at least one modified control signal, and said activating means comprises an encoding switch for switching the encoding means between said first and second encoding states, whereby said activating means when activated reprograms said encoding means to generate a modified control signal causing said decoding means to disable said protection device.

13. The apparatus of claim 12, wherein said encoding switch comprises a manually operated single pole push-button switch.

14. Apparatus for enabling or disabling a property protection device by remote control, said apparatus comprising:

(a) a portable remote control unit comprising
 (1) an encoder programmable to generate at least one control signal, said encoder being reprogrammable to generate at least one modified control signal;

(2) means for switching said encoder between said programmed and said reprogrammed states, said encoder switching means being manually activatable;

(3) means operatively connected to said encoder for transmitting said signals generated by said encoder, said transmitting means being capable of effectively transmitting said signals for only a relatively limited distance;

(b) protection device enabling-disabling means comprising:

(1) means for receiving said transmitted signals, said receiving means being capable of effectively receiving said signals only when said portable remote control unit is less than said distance from said receiving means;

(2) a decoder operatively connected to said receiving means for disabling said protection device when a valid signal is being received by said decoder and enabling said protection device in response to a valid signal not being received, said decoder being programmed to accept only a control signal as valid and also being reprogrammable to accept only a modified control signal as valid;

(3) means for switching said decoder between said programmed and reprogrammed states, said decoder switching means automatically switching said decoder to said reprogrammed state in response to enablement of said protection device and automatically switching said decoder to said programmed state in response to disablement of said protection device, whereby, after said protection device has been enabled in response to said portable unit being carried a sufficient distance away from said receiving means, said encoder switching means must be manually activated to reprogram said encoder to generate a modified control signal to disable said protection device when said portable unit has been carried back to within said distance of said receiving means.

15. The apparatus of claim 14, wherein said control signal comprises at least one word comprising a predetermined number of bits and said encoder is reprogrammable by activating said encoder switching means to change the value of at least one bit in said word, and said decoder is reprogrammable by operating said decoder switch to change the value of the word the decoder will accept as valid by the same value of the corresponding at least one bit.

16. The apparatus of claim 15, wherein the encoder switch comprises a manually activated pushbutton mounted on said portable unit, and said decoder switch comprises at least one solenoid coil responsive to said decoder for switching said decoder to said reprogrammed state in response to enablement of said protection device and for switching said decoder to said programmed state in response to disablement of said protection device.

17. Remote control apparatus for automatically controlling a protection device associated with a property, said device being capable of switching between at least two states with respect to the protection of said property, said remote control apparatus comprising:

(a) means for generating at least one control signal for controlling the state of said protection device;

(b) means for transmitting said signal, said transmitting means being portable and having a range substantially limiting the distance said signal can be transmitted;

(c) means for receiving said signal, said receiving means responsive to said signal to switch said device to a first state when said signal has been received and to a second state when said signal has not been received for a preselected time interval; and (d) means for detecting the presence of at least one person inside said property, said detecting means being responsive to said presence to prevent said receiving means from switching said device between said first and second states while said person is inside said property, whereby said device is in said first state when said transmitting means is within said range of said receiving means and said device is in said second state when said transmitting means is outside said range of said receiving means and no person is inside said property.

18. Remote control apparatus for automatically controlling a protection device associated with a property, said device being capable of switching between at least two states with respect to the protection of said property, said remote control apparatus comprising:

(a) encoding means for producing a signal comprising identification information for controlling the state of said protection device, said encoding means being adapted for operation from an electrical energy source, said encoding means for continuously generating a series of said signals each said signal having a predetermined time duration and each signal being separated in time from the previous signal in the series by a predetermined time interval, said signal duration being relatively short compared to said time interval;

(b) means for transmitting said signal, said transmitting means being portable and having a range substantially limiting the distance said signal can be transmitted;

(c) means for receiving said signal, said receiving means responsive to said signal to switch said device to a first state when said signal has been received and to a second state when said signal has been received for a preselected time interval, said receiving means comprising decoding means responsive to said identification information to switch said protection device to said first state only when said signal is being received;

whereby said device is in said first state when said transmitting means is within said range of said receiving means and said device is in said second state when said transmitting means is outside said range of said receiving means and the energy consumed by said encoding means is reduced.

19. The remote control apparatus of claim 18, wherein said energy source has a limited capacity, and said apparatus further comprises means for monitoring said capacity and disconnecting said source from said encoding means when said capacity falls below a predetermined level, and said apparatus further comprises a means for manually reconnecting said source to said encoding means for a selected time, whereby said energy source is conserved by interrupting the continuous generation of said signals when said capacity falls below said level and by manually reactivating the encoding means temporarily as required.

20. Remote control apparatus for automatically controlling a protection device associated with a motor vehicle, the operation of said vehicle being controlled by placing a key into a keyway means, said device being capable of switching between at least two states with respect to the protection of said property, said remote control apparatus comprising:

(a) means for generating at least one control signal for controlling the state of said protection device;

(b) means for transmitting said signal, said transmitting means being portable and having a range substantially limiting the distance said signal can be transmitted;

(c) means for receiving said signal, said receiving means responsive to said signal to switch said device to a first state when said signal has been received and to a second state when said signal has not been received for a preselected time interval; and (d) means for disabling said receiving means in response to said key means being placed in said keyway means, whereby said device is in said first state when said transmitting means is within said range of said receiving means and said device is in said second state when said transmitting means is outside said range of said receiving means and said receiving means is prevented from switching said device between said first and second states when said key means is placed in said keyway means.

* * * * *